Figure 2B:
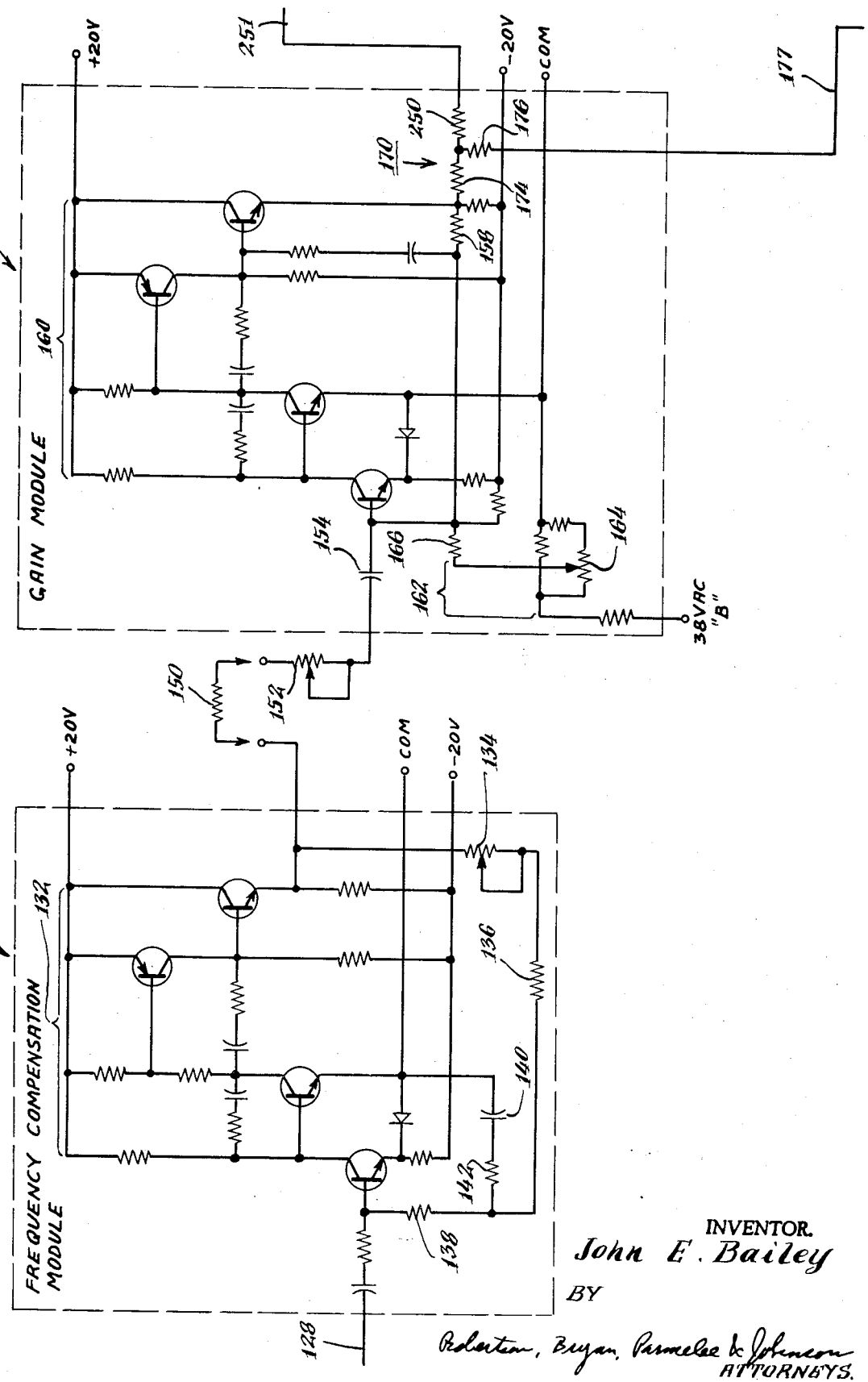

United States Patent [19]
Bailey

[11] 3,715,918
[45] Feb. 13, 1973

[54] MAGNETIC FLOWMETER APPARATUS

[75] Inventor: John E. Bailey, Needham, Mass.

[73] Assignee: The Foxboro Company, Foxboro, Mass.

[22] Filed: April 29, 1970

[21] Appl. No.: 32,804

[52] U.S. Cl. ............................................. 73/194 EM
[51] Int. Cl. ............................. G01f 1/00, G01p 5/08
[58] Field of Search .............................. 73/194 EM

[56] References Cited

UNITED STATES PATENTS

| | | | |
|---|---|---|---|
| 3,131,560 | 5/1964 | Cushman et al. | 73/194 EM |
| 3,263,500 | 8/1966 | Krishnaswamy et al. | 73/194 EM |
| 3,339,410 | 9/1967 | Steru | 73/194 EM |
| 3,433,066 | 3/1969 | Bailey | 73/194 EM |
| 3,449,951 | 6/1969 | Westersten | 73/194 EM |

Primary Examiner—Charles A. Ruehl
Attorney—Bryan, Parmelee, Johnson & Bollinger

[57] ABSTRACT

Magnetic flowmeter apparatus comprising a flow head producing an alternating flow potential which is directed to an electronic transmitter apparatus arranged to produce a d-c flow signal corresponding to flow rate. The transmitter includes a number of physically separate modules each including a solid-state amplifier, and having circuit elements arranged to provide specific functions such as zeroizing the common mode signals, injecting quadrature and in phase signal components, compensating for line voltage and frequency variations, and the like. The overall transmitter system is arranged in an open-loop, non-feedback configuration.

30 Claims, 7 Drawing Figures

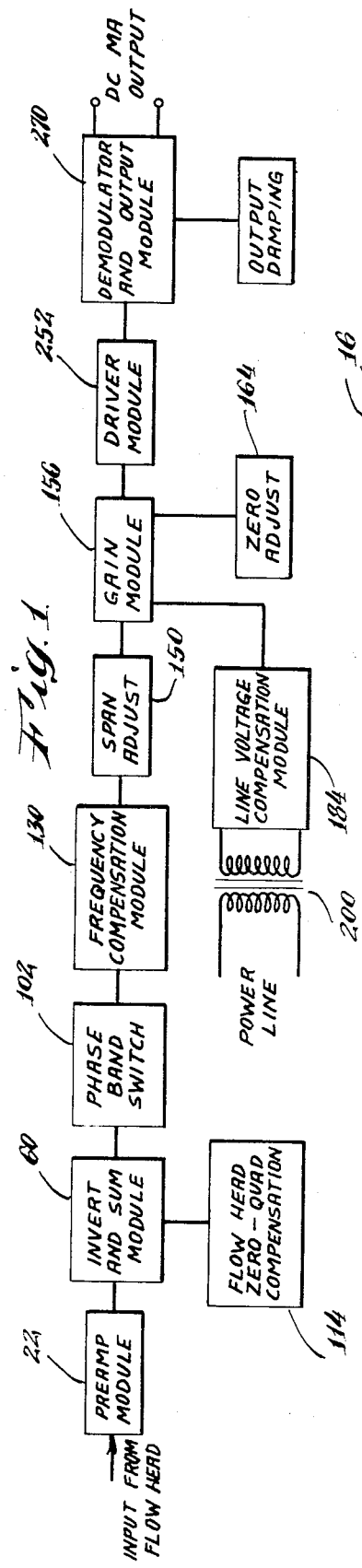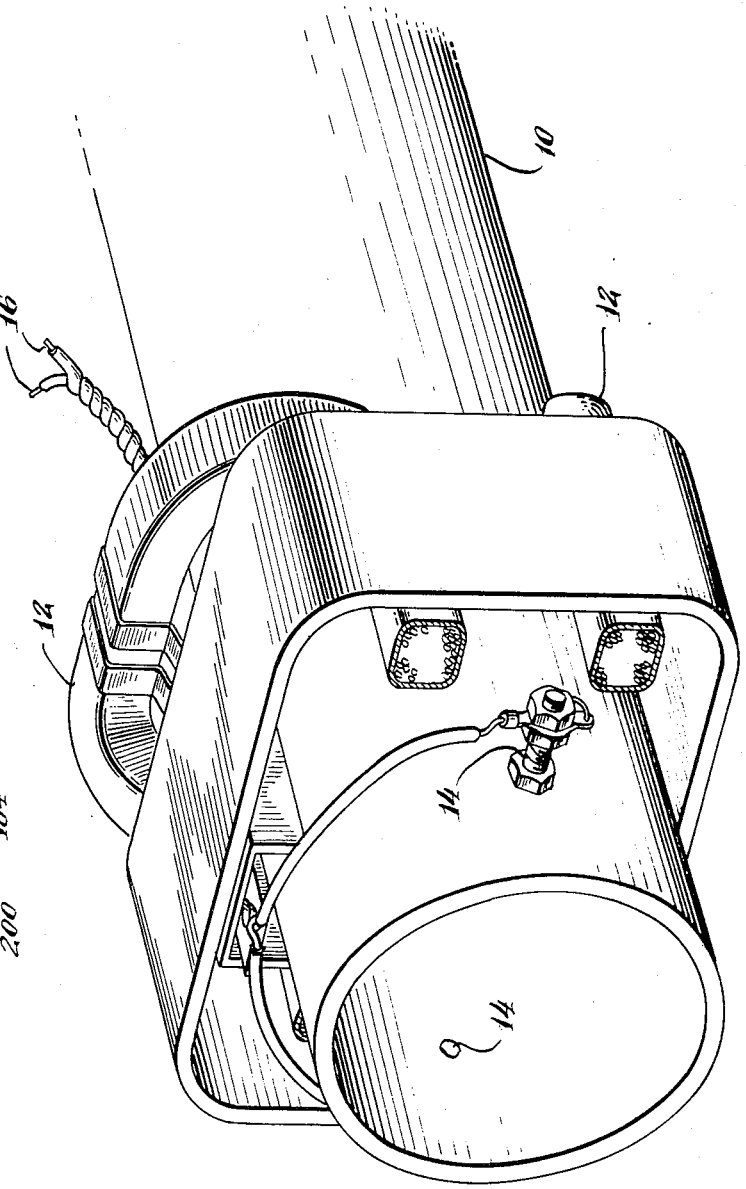

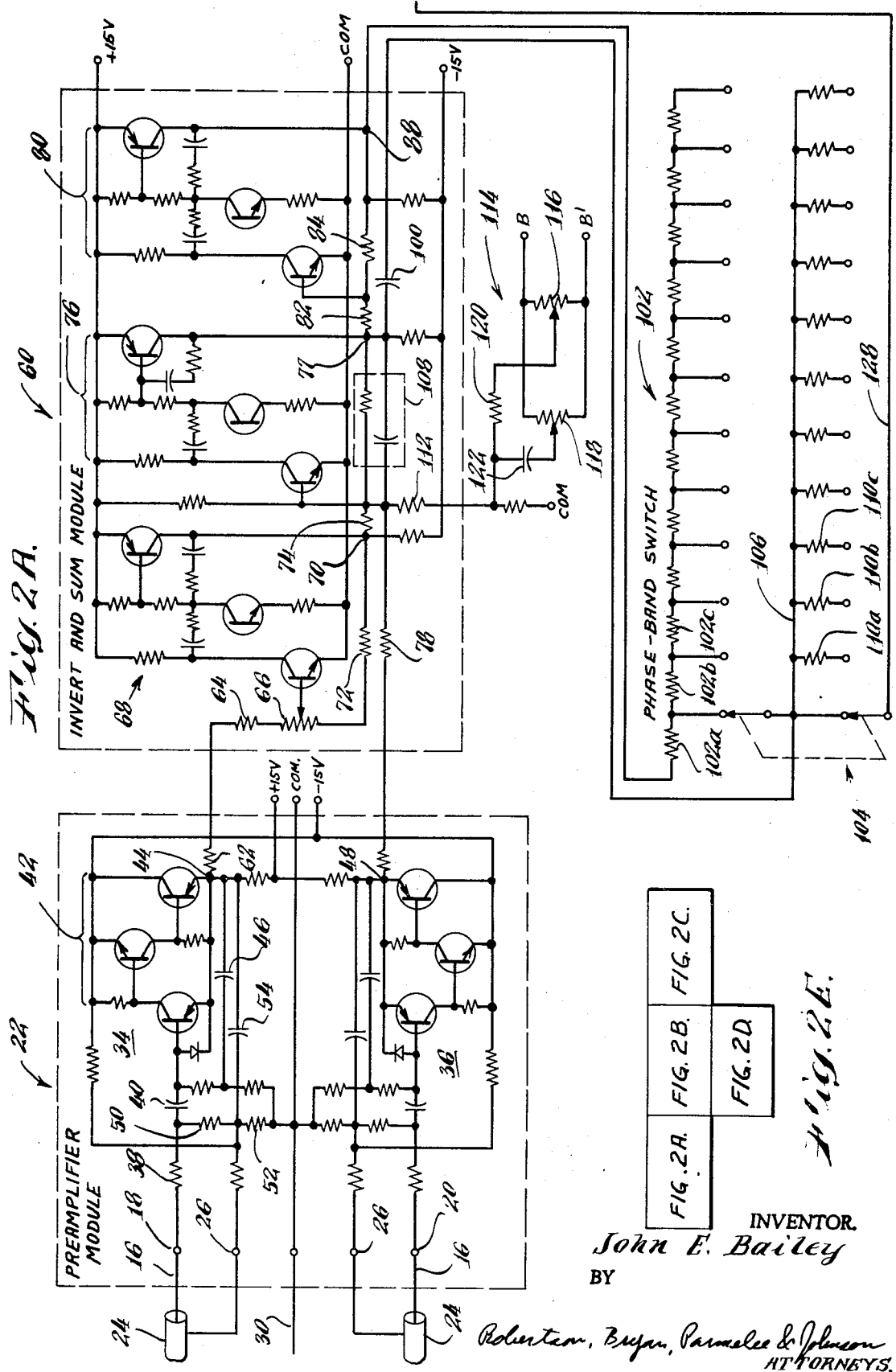

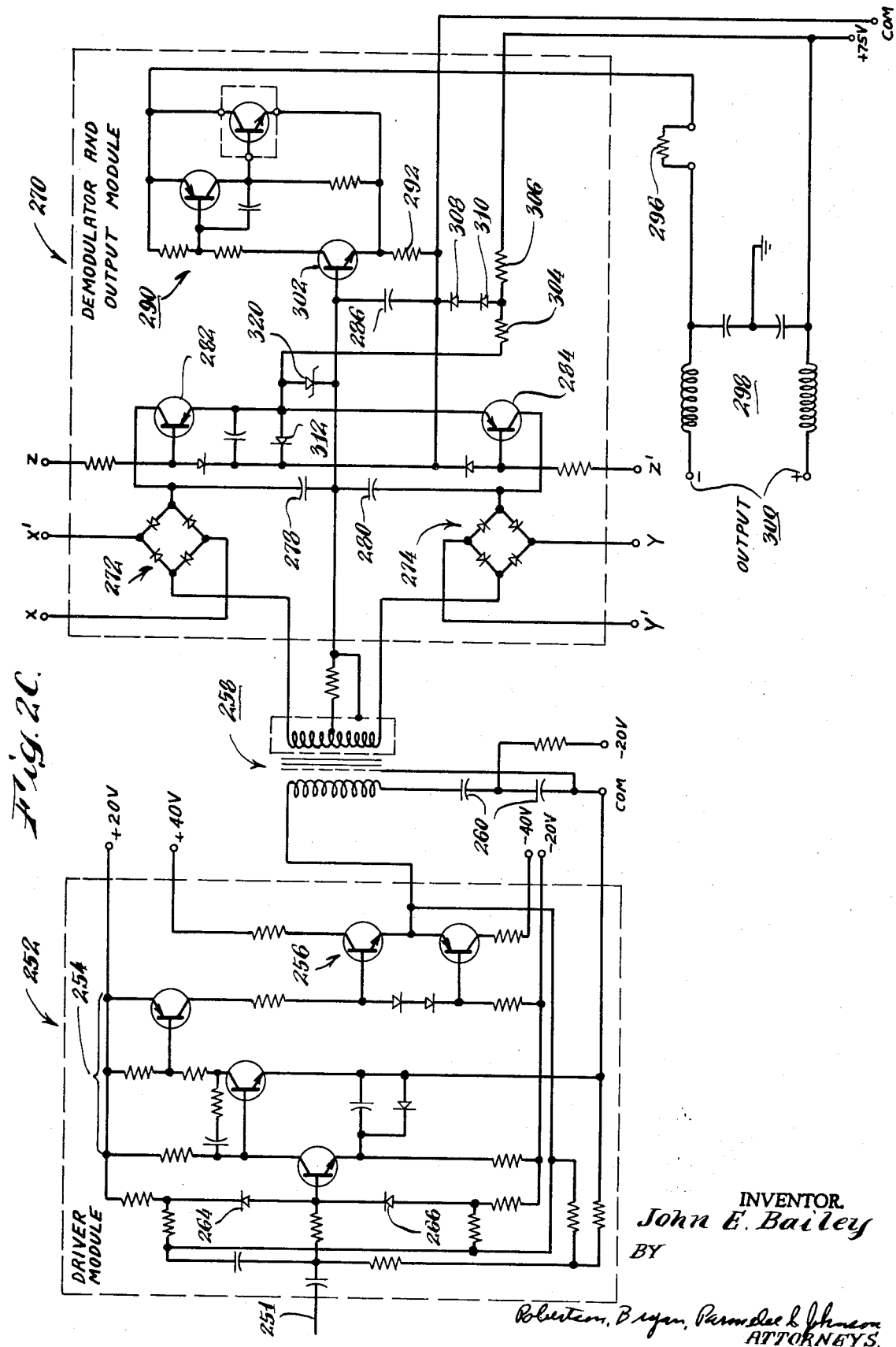

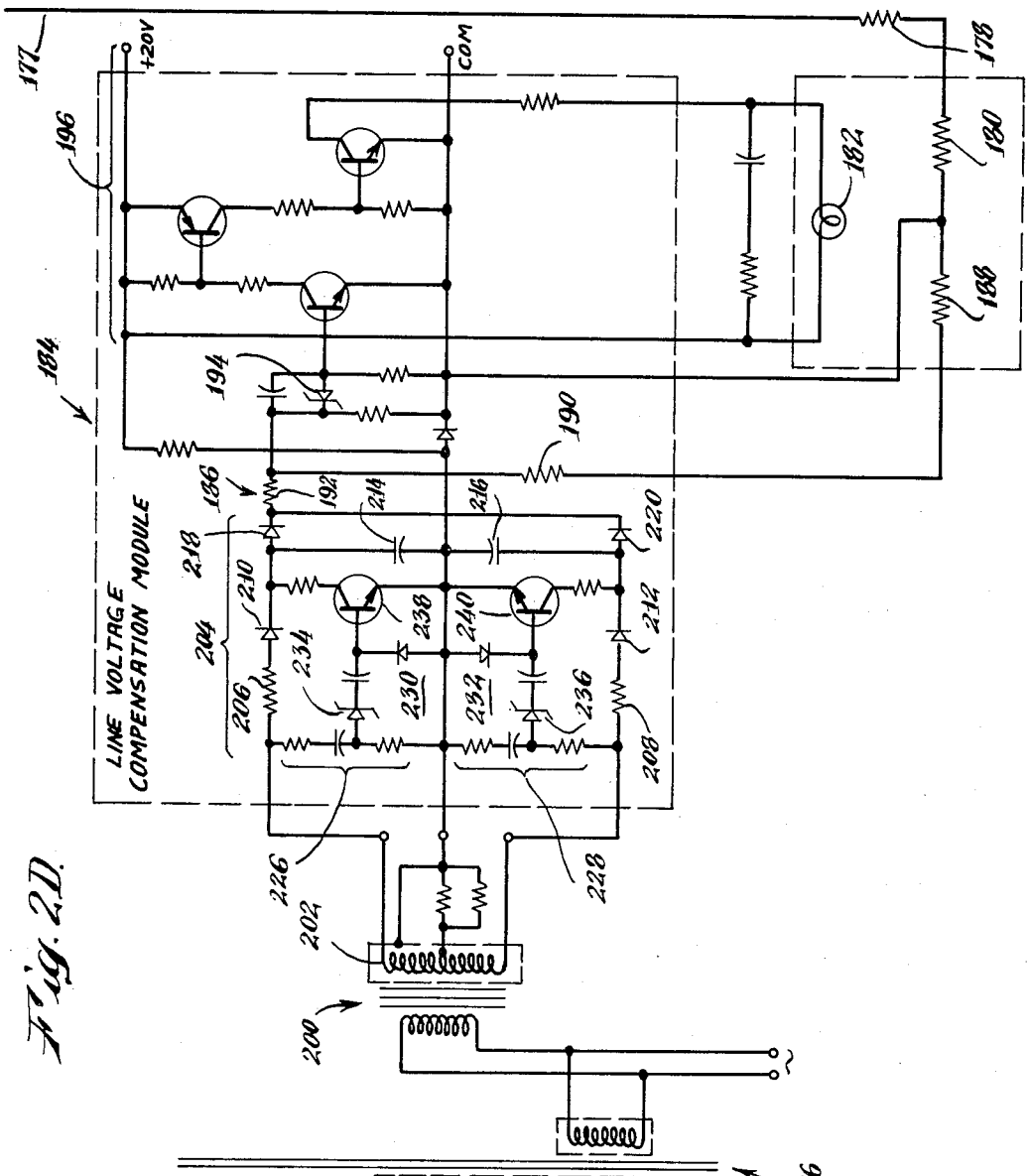
Fig. 2D.
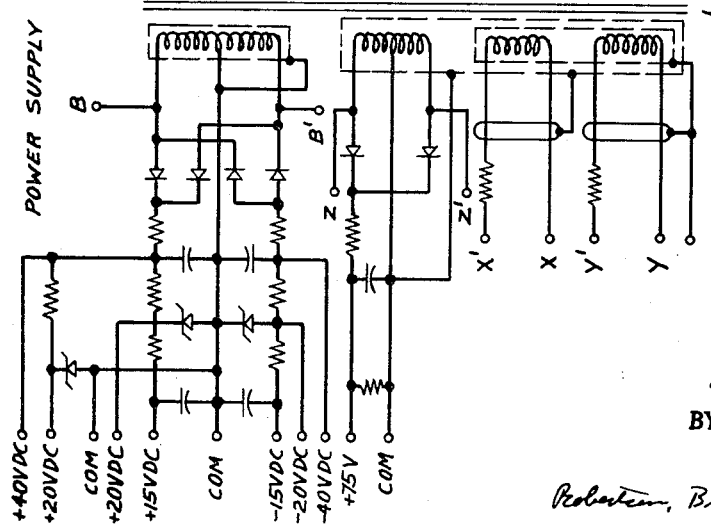
INVENTOR.
John E. Bailey
BY
Robertson, Bryan, Parmelee & Johnson
ATTORNEYS.

MAGNETIC FLOWMETER APPARATUS

This invention relates to magnetic flowmeters. More particularly, this invention relates to improvements in such flowmeters providing superior performance with reliable operation and reduced construction costs.

Magnetic flowmeters of various types have been sold commercially for a number of years. Conventionally, such flowmeters comprise a section of pipe to which is secured a pair of magnetic coils adapted to produce an alternating magnetic field in the liquid flowing through the pipe. Electrodes extending through opposite sides of the pipe make electrical contact with the liquid to sense the alternating e.m.f. generated by the movement of the liquid through the magnetic field. The flow potential thus developed is conducted by wires to electronic apparatus adapted to produce a relatively high-powered flow signal (e.g. a d-c signal in the range of 10-50 milliamps) corresponding to the a-c potential at the electrodes.

As shown in U.S. Pat. No. 3,433,066 issued to John E. Bailey, the flowmeter electronic apparatus may include a preamplifier the output of which is transformer-coupled to a relatively high-gain control amplifier providing a number of complex functions such as phase-sensing, zero-setting, etc. and having an overall negative feedback circuit to produce an effective null at the coupling transformer. With such feedback, the presence of non-linearities or other undesired variations in the control amplifier circuitry can be compensated for, so as to produce at the amplifier output a flow signal corresponding to the generated e.m.f. represented by the output of the preamplifier.

Although such a magnetic flowmeter design configuration has been used extensively, it has not been entirely satisfactory. For example, use of negative feedback around the entire control amplifier results in a relatively inflexible design to which changes cannot readily be made for the purpose of incorporating advances in technology, without introducing serious problems with stability. Moreover, prior magnetic flowmeter designs were not well adapted to take advantage of modern production techniques, and thus were excessively costly to manufacture.

In accordance with one aspect of this invention, the flowmeter design comprises a series of individual solid-state amplifier modules each providing a separate function, and connected together in a series-cascade, open-loop (non-feedback) configuration. Each module is effectively isolated from a design stand-point from the other modules, and the composite set of modules operates stably as a complete system without highly critical characteristics. In accordance with another aspect of the invention, the magnetic flowmeter is provided with improved line-voltage compensation means for avoiding or minimizing effects on the output signal of changes in the amplitude of the a-c supply voltage.

Accordingly, it is an object of this invention to provide a superior magnetic flowmeter design. Another object of this invention is to provide a flowmeter design affording flexibility and reduced cost of manufacture. Still another object of this invention is to provide an improved line-voltage compensating means for a magnetic flowmeter. Other objects, aspects and advantages of the invention will in part be pointed out in, and in part apparent from, the following description considered together with the accompanying drawings in which:

FIG. 1 is a block diagram identifying the individual function modules of electronic apparatus embodying this invention;

FIGS. 2A through 2D together present a schematic diagram of a preferred embodiment of the invention;

FIG. 2E shows the manner in which FIGS. 2A through 2D are physically interrelated; and FIG. 3 shows a flow head structure in simplified form.

Referring first to FIG. 3, there is shown a flow head comprising a pipe section 10 having a pair of opposed magnetic coils 12 energized by an a-c supply voltage so as to produce an alternating magnetic field transversely through the flowing liquid. A pair of electrodes 14 contact the flowing liquid to pick up the generated a-c flow potential which is conducted by leads 16 to input terminals 18 and 20 (see the left-hand edge of FIG. 2A) of a preamplifier module 22. The leads 16 are surrounded by electrostatic shields 24 connected to corresponding terminals 26 at the preamplifier so as to drive the shields with an a-c signal corresponding to the flow voltage, thereby reducing capacitance leakage currents. A fluid "ground" is provided by a connection 30 from the preamplifier to the liquid. This connection to the liquid is not shown in FIG. 3, but is arranged in conventional fashion, effectively in a location intermediate the electrodes.

The preamplifier module 22 includes a balanced amplifier with two identical sections 34 and 36 presenting a high input impedance provided by bootstrap feedback connections. Referring now to the upper amplifier section 34, the a-c flow potential from one electrode is connected through input terminal 18, a relatively high-impedance resistor 38, and a coupling capacitor 40 to a three-transistor amplifier 42. This amplifier produces an intensified output voltage on a terminal 44 which also is connected to a capacitor 46 providing bootstrap feedback. (It may be noted that the lower section 36 of the preamplifier produces a corresponding but oppositely-phased output voltage on a second output terminal 48.) The feedback voltage is very nearly equal to the applied voltage so that very little current is drawn from the electrodes.

A pair of series-connected resistors 50 and 52 provide a d-c path to common for any electrostatic potentials which might otherwise build up on the signal leads. A boot-strap feedback connection is provided through a capacitor 54 to the junction of these resistors, and this junction also is connected to the respective electrostatic shield 24, so that the shields are "driven" with an a-c signal nearly equal to the flow potential.

The output terminals 44 and 48 of the preamplifier module 22 are coupled to an "Invert and Sum" module 60 one important function of which is to reduce to a suitably low level any common-mode signals accompanying the flow voltage, without the use of a coupling transformer as in prior designs. The upper portion of the preamplifier output 44 is connected through a small (33 ohm) resistor 62, a 10K summing resistor 64, and a 1K common-mode adjustment potentiometer 66 to a three-transistor unity-gain amplifier 68. This amplifier produces at its output 70 a voltage corresponding to its input signal, but inverted 180° with respect thereto.

This output is coupled through a 10K negative feedback resistor 72 to the adjustment potentiometer 66 which thus serves to vary the effective gain of the amplifier, i.e. so as to make trimming adjustments to the magnitude of the inverted-phase signal.

The output signal on terminal 70 is coupled through a 10K summing resistor 74 to the input of a second amplifier 76 having a unity gain. This second amplifier also receives a signal through another 10K summing resistor 78 connected to the lower output terminal 48 of the preamplifier module 22. The signal from this terminal will be in phase with the inverted signal from the first amplifier, and thus this second amplifier 76 will sum the two signals to produce on its output terminal 77 a total signal having an amplitude twice that of either of the two inputs to the amplifier.

It should particularly be noted that any common mode signals on the preamplifier terminals 44 and 48 are effectively cancelled with this Invert and Sum arrangement. The potentiometer 66, by permitting variation of the magnitude of the inverted voltage applied to the input of the second amplifier, provides a zero adjustment for the common mode signal.

The output of the second amplifier 76 is supplied to the input of a third unity-gain amplifier 80 which, like the second amplifier, serves as an inverter. The gain of this third stage is controlled by the two resistors 82 and 84, each 10K. Frequency-selective "Bode feedback networks" comprising series resistors and capacitors, are provided between the separate stages of each amplifier 68, 76 and 80 to insure a proper phase relationship for minimizing instability.

The output of the third amplifier 80 appears on terminal 88 and is equal in amplitude to that of the second amplifier 76 on terminal 77, but of opposite phase. The outputs of these two amplifiers are connected to respective ends of a series-connected R-C network consisting of a capacitor 100 and an adjustable resistor generally indicated at 102. In effect, this network is energized by two oppositely-phased a-c signals of essentially equal amplitude. Thus the network provides a phase-splitting function, to furnish at the junction between the resistance and capacitance elements a net output signal of adjustable phase, depending upon the magnitude of the resistance 102 selected for the network.

The effective resistance 102 of the phase-splitting R-C network is controlled by a band-switching arrangement 104 which determines the number of individual resistors 102$a$, 102$b$, etc. connected into the circuit. The capacitance 100 of the network is of fixed value (22 microfarads). The output signal from this network appears on a lead 106 from the junction of the resistance and capacitance portions of the circuit. The phase of the output signal with respect to the phase of the signal at the input ranges (depending upon the setting of the variable resistance) between −3° (lagging) to +21° (leading).

The −3° lagging phase shift is produced by a fixed feedback network 108 for the second amplifier 76, while the R-C network 100/102 provides an adjustable differential phase shift of 24°. To ensure a substantially constant output amplitude throughout the range of phase variation, there are provided compensating resistors 110$a$, 110$b$, etc., which are selectively switched in series with the output lead 128 by operation of the phase-band switch 104. The R-C network has an attenuation factor of 0.5, so that the net (overall) gain of the Invert and Sum module 60 is essentially unity.

The Invert and Sum module 60 also includes means for injecting into the a-c flow signal controllable amounts of both in-phase and quadrature components from the a-c supply voltage, thus permitting the flow signal to be zeroized with respect to such components. The injection is made at the input of the second amplifier 76, through a 200K isolating resistor 112 which is coupled to a network generally indicated at 114. This network includes two adjustment potentiometers 116 and 118 each energized by the a-c supply line. The movable arm of one potentiometer 116 is connected through a resistor 120 to the isolating resistor 112 to supply inphase current to amplifier 76. The signal picked off by the movable arm of the other potentiometer 114 is coupled through a phase-shifting capacitor 122 to provide the quadrature component of signal current for the amplifier 76.

The output of the Invert and Sum module 60 is directed along a lead 128 to a Frequency-Compensation module 130 the gain of which increases linearly with frequency in such a way as to compensate for the reduction in flow signal which occurs with increasing frequency due to the linear change in inductive reactance of the flow head coils 12. This module 130 additionally serves to provide adjustable system gain of approximately 70, depending on frequency and setting of the gain adjustment. Finally, the Frequency-Compensation module introduces a fixed leading phase shift of 85° to bring the flow signal into phase alignment with the a-c supply voltage, thereby permitting convenient demodulation to a d-c signal in a subsequent module of the system.

The Frequency-Compensation module 130 basically comprises a four-transistor amplifier 132 with an open loop gain of around 450,000. Negative feedback is provided for this amplifier to set the overall gain to a proper level, and to effect required phase and frequency compensation. The negative feedback circuit includes a 20K gain-adjusting resistor 134 in series with fixed resistors 136 and 138 of 30.1K and 61.9K ohms. A capacitor 140 is connected to shunt current from the feedback path to common, thereby providing desired phase and frequency effects.

Specifically, at lower operating frequencies this capacitor has a relatively higher reactance and shunts less current from the negative feedback path, that is, it allows more negative feedback current to reach the summing junction of the amplifier. Thus it will be apparent that the amplifier gain decreases with decreasing frequency. The flow potential at the flow head increases with decreases in frequency, due to the reduction in inductive reactance of the coils 12 at the lower frequencies. Accordingly, the reduction in gain of amplifier 132 with decreasing frequency compensates for the increase in flow potential, so as to produce a net flow signal substantially unaffected by frequency, within the design range of 48 to 62 Hz.

The slope of amplifier output vs. frequency is linear at 6 db. per octave over the frequency range of 48 to 62 Hz. This linear relationship was obtained without the use of complex sharp cut-off filters by extending the linear range well beyond the desired range, e.g. to a peak gain frequency of about 2K Hz. The cut-off is accomplished by Bode feedback networks in the amplifier, and by the resistor 142 in series with capacitor 140 to limit the amount of shunt current.

The negative feedback circuit, including shunt capacitor 140, also provides a phase shift of 85° (leading), to counteract the lagging phase shift produced at the flow head by the substantially inductive character of the magnetizing coils 12. An 85° phase shift was selected for this module 130 because this is the nominal amount of phase shift produced by the inductive reactance and resistance in the typical coils 12.

Flow heads of different pipe size introduce lagging phase-shifts of different amounts between the energizing a-c supply voltage and the flow potential at the electrodes. For a full range of practical flowmeter head sizes, it has been found that the lagging phase shift introduced at the flow head typically ranges from 82° to 106°, thus determining the amount of leading phase shift which must be produced in the electronics portion of the system to create an in-phase flow signal. As noted above, the Frequency-Compensation module 130 provides 85° of this compensation, with a circuit which approximately matches, in an inverse sense, the characteristics of coils 12, both as to phase-shift and amplitude vs. frequency. An additional and adjustable constant-amplitude phase shift of between −3° (lagging) to +21° (leading) is provided in the Invert and Sum module, as outlined above, to compensate for the constant-amplitude phase-shift produced by different pipe sections.

The output of the Frequency-Compensation module 130 is directed through a selectable range resistor 150, a variable span resistor 152, and a coupling capacitor 154 to a Gain module 156. The gain of this module is determined by the ratio of the magnitudes of the input resistors 150 and 152 to the magnitude of a feedback resistor 158. This gain is nominally variable between 0.75 and 7.5, by adjustment of span resistor 152.

This Gain module 156 includes means for introducing a "live zero" into the flow signal by inserting an a-c component of proper value to produce a predetermined d-c output signal level (e.g. 10 ma.) at zero flow rate. This a-c component is injected as a bias at the input of the Gain module amplifier 156. Thus the magnitude of the live-zero signal is independent of changes in the setting of the span resistor 152.

The a-c bias signal for amplifier 160 is derived from a resistance network 162 supplied with power from the a-c line. This network includes an adjustment potentiometer 164 which controls the magnitude of a-c current injected through an isolating resistor 166 to the amplifier input. To set the bias injection at the correct level, the first three modules 22, 60 and 130 first are set so as to produce a zero input signal to the Gain module 156 for zero flow rate condition. Then potentiometer 164 is adjusted to fix the d-c output signal (see below) at the required level.

The output of the Gain module 156 is directed to a multiplier circuit which in this embodiment is an attenuation network 170 arranged to effectively multiply the module output by a controllable factor less than one. (Note: This network can be looked on as a divider, but for purposes of clarity and consistency of terminology, such circuit will be referred to herein generally as a multiplier.) The attenuation network 170 forms part of an improved means for automatically compensating for the effects of changes in a-c supply voltage amplitude. It is known that such compensation is necessary because the flow potential developed at the flow head electrodes (14) varies directly with line voltage. Thus the system gain should be made to vary inversely with line voltage in order to produce a final flow signal unaffected by fluctuations in line voltage amplitude.

The multiplier-attenuation network 170 specifically comprises a series resistor 174 (7.32K) and a shunt resistor 176 (7.32K), the latter being connected (referring to FIG. 2D) through a resistor 178 of selected magnitude (between zero and 600 ohms) to a photo-resistor 180 (nominally 75K) the remote end of which is returned to common. The ohmic resistance of the photo-resistor is determined by the intensity of light radiation incident thereon from an incandescent light bulb 182. This radiation is controlled, in a manner to be explained, so as to set the effective attenuation of network 170 on the output of the Gain module at the correct multiplication value for proper line voltage compensation. That is, the resistance of the photo-resistor automatically is adjusted to a level such that the voltage at the junction point of resistors 174 and 176 is unaffected by line voltage fluctuations.

The intensity of radiation from light source 182 is controlled by a Line Voltage Compensation module 184 which automatically sets the current through the light source at a proper level responsive to changes in line voltage. The control is exercised through a feedback arrangement which includes a second multiplier circuit generally indicated at 186. This second multiplier is, like the first-mentioned multiplier 170, in the form of an attenuation network comprising a second photo-resistor 188 (nominal 75K) connected from common through a fixed shunt resistor 190 (7.32K) to a fixed series resistor 192 (7.68K).

The input to this second multiplier 186 is a pulsating d-c signal derived from the a-c supply line and applied to the left-hand end of the series resistor 192. The output of the multiplier appears at the junction of resistors 190 and 192, and is a d-c signal attenuated by a multiplication factor determined by the value of the second photo-resistor 188.

The two photo-resistors 180 and 188 are a nearly identical, matched pair of elements, e.g. such as in the dual cadmium-sulfide photoconductor unit known commercially as Clairex CL705L/2. In this unit, the two elements are simultaneously laid on a common substrate using a common junction lead, housed in a TO5 transistor case with glass window and sealed. Both elements are subject to the same radiation intensity from lamp 182, and thus the resistances of the two elements will track very closely. Since the two photo-resistors form part of effectively identical multiplier-attenuation networks, the multiplication factor (degree of attenuation) of the two networks also will track very closely throughout the operating range.

The pulsating d-c input to the second multiplier 186 varies with line voltage, and the attenuated output of the multiplier is compared with a fixed reference voltage produced by a Zener diode 194. The light radiation of source 182 is automatically controlled to a level producing a multiplication factor which causes the net (average) multiplier output to be substantially equal to the reference voltage.

This automatic control is effected by a comparison means which in the preferred embodiment is a high-gain three-transistor amplifier 196. This comparison means senses any difference between the net (average) output of multiplier 186 and the fixed reference voltage provided by Zener diode 194, and adjusts the current through the light source 182 so as to maintain the difference signal at the amplifier input close to zero.

By this comparison-feedback means, the second photoresistor 188 is automatically adjusted to a value providing an attenuation factor for multiplier 186 which substantially eliminates, at the input to amplifier 196, any effect of changes in line voltage. Thus at all times the attenuation factor represents the amount by which the line voltage must be multiplied to cause the result to equal a predetermined reference value. Because the first photo-resistor 180 tracks the second photo-resistor 188, the first multiplier 170 automatically will be set to this same attenuation factor, and thus will multiply by that factor the flow signal produced at the output of the Gain module 156. Accordingly, the output of the first multiplier (represented by the voltage at the junction of resistors 174 and 176) will represent a flow signal which has been substantially compensated for changes in line voltage, i.e. the flow signal will be substantially unaffected by line voltage fluctuations.

Turning now to the Line-Voltage Compensation module in more detail, the input to the module is derived from a transformer 200 having a primary winding connected to the same a-c supply line which energizes the magnetizing coils 12 at the flow head. This transformer is temperature-compensated for copper resistance changes, as by means of a thermistor-resistor network embedded in the transformer. The voltage from the center-tapped secondary winding 202 is directed to a weighted peak-reader circuit generally indicated at 204, and which produces a d-c output proportional to the a-c line voltage and having 120 Hz. ripple.

The remote ends of the secondary winding 202 are connected to respective half-wave rectifier circuits each comprising a resistor 206 (208), diode 210 (212) and a storage capacitor 214 (216). The outputs of these rectifier circuits are coupled through a respective peak-selector diode 218 (220) to the series resistor 192 of the attenuation-multiplier 186, previously described, to present to that multiplier a full-wave d-c rectifier voltage having a sawtooth ripple of 120 Hz. and an amplitude proportional to the line voltage.

The response time of such a rectifier circuit is relatively slow for decreases in a-c amplitude, due to the discharge R-C time constant of the elements involved. To speed up this response, there is provided a network which discharges each storage capacitor 214 (216) on alternate half-cycles, so that these capacitors start each conduction cycle at less than peak supply voltage.

For this purpose, the a-c input signal is supplied to two identical, balanced phase-shifting circuits 226 (228). Each phase-shifting circuit produces a signal having a phase angle leading the respective applied voltage by 60°. This leading signal is directed through a coupling circuit 230 (232), including a series Zener diode 234 (236), to the base of a corresponding transistor 238 (240) connected across the storage capacitor 214 (216). Thus, approximately 60° before the start of the positive (charging) half-cycle for the half-wave rectifier 210 (212), the transistor 238 (240) will be turned on to discharge the respective storage capacitor. When the phase-shifted voltage reaches its peak (approximately 60° before the supply voltage reaches its peak) and starts to decrease, the diode 234 (236) is reverse-biased, so that the transistor 238 (240) ceases to conduct. Thereafter, the storage capacitor 214 (216) will be charged up to peak level in the remaining 60° of the positive-going portion of the supply line half-cycle.

The output of the multiplier 186 is applied through Zener diode 194 to the input of amplifier 196. Only voltage levels above the Zener break-down voltage (e.g. 8.2 volts) are coupled through to the amplifier. In normal operation, just the peaks of the sawtooth ripple reach the amplifier. The amplifier 196 has a high gain, and thus produces an output of saturated square waves at a frequency of 120 Hz.

An increase in line voltage causes an increase in the d-c rectified signal which is applied through the multiplier 186 to the Zener diode 194 and the amplifier input. This increases the duty-cycle of the square-wave output, and thereby increases the average current to the lamp 182 so as to decrease the resistance of the photoresistor 188. This causes increased attenuation in the multiplier 186, thereby tending to hold the voltage at the input to amplifier 196 constant. The multiplier 170 correspondingly introduces increased attenuation into the output of the Gain module 156, so as to compensate for the increased amplitude of signal applied to the input of that module as a result of the increase in line voltage.

The line-voltage-compensated output of the Gain module 156 is directed through a summing resistor 250 (30.1K) to the input terminal of a Driver module 252. This module includes a three-transistor voltage amplifier 254 arranged to drive a complementary-symmetry Class B push-pull amplifier 256. The output of this latter amplifier is coupled to a transformer 258 by a pair of back-to-back electrolytic capacitors 260 supplied with d-c polarizing voltage. These capacitors block the passage of d-c through the transformer windings.

The gain of the Driver module 252 is determined by the relative magnitudes of the input summing resistor 250 and the resistance of the negative feedback path. Nominally, this gain is set at 18.3, and in the disclosed system is such as to provide for the magnetic flowmeter transmitter a final d-c output current (see below) of 10 ma. with an input to the Driver of 0.076 v., and an output of 50 ma. with an input to the Driver of 0.38 v. The input circuit of the Driver module includes a clamping arrangement basically comprising a pair of diodes 264, 266 with associated resistors, arranged to prevent saturation of the output stage if the Driver input is accidentally overdriven.

The output transformer 258 associated with this Driver module 252 has shielded windings with an effective primary to secondary capacitance of less than 1 pf.

This provides isolation between the transmitter signal, which is reference to fluid ground, and the transmitter output which is normally floating but which can be tied to ground.

The secondary of the transformer 258 is center-tapped to provide a balanced voltage signal for the Demodulator and Output module 270. The individual sections of this voltage are directed to respective phase-sensed, diode-rectifier bridge circuits 272, 274. These diode bridges serve effectively as switches synchronized by corresponding line voltage signals derived from windings XX' and YY' of the main power supply transformer 276 (FIG. 2D). These switches supply current to respective initial storage capacitors 278, 280 which charge up to a voltage proportional to the average value of the negative half-cycle of the corresponding section of the balanced voltage from transformer 258.

The voltages of the initial storage capacitors 278, 280 are alternatively sampled at line frequency by a pair of transistor switches 282, 284 activated by a-c leads Z, Z' from the main power transformer 276. The current through these switches flows to a final storage capacitor 286 and develops a composite voltage representing the measured flow rate. These switches are opened only during the relatively constant (flat) portions of the waveforms on the initial storage capacitors, so as to tend to minimize ripple on the final voltage signal.

The voltage on capacitor 286 is applied as the input to a voltage-to-current converter comprising a three-transistor amplifier 290. This amplifier produces an output current in the range of 10 to 50 ma. (or, by changing a resistor 292, in the range of 4 to 20 ma.) through an output circuit including selectable resistors 296 and a filter 298 leading to output terminals 300.

The first stage 302 of amplifier 290 is provided with operating bias and temperature compensation by a d-c energized network consisting of resistors 304, 306 and diodes 308, 310, 312. The d-c voltage drop across diode 312 is applied in series with the d-c output of the demodulator so that transistor 302 will begin conduction as soon as any d-c appears at the demodulator output.

Output limiting is provided by a 13 v. Zener diode 320 which limits the maximum d-c signal impressed on the input to transistor 302, so as to limit the maximum output current to about 55 ma. The output current is essentially independent of load over a range of 100 to 660 ohms, for an output current range of 10 to 50 ma.

I claim:

1. In magnetic flowmeter apparatus of the type comprising means responsive to an a-c power supply source for producing a corresponding a-c magnetic field in the flowing liquid, means for developing a flow signal corresponding to the a-c voltage generated by movement of the liquid through said field, and output means under the control of said flow signal;

that improvement in said apparatus for minimizing changes in said flow signal due to variations in the amplitude of the a-c supply voltage, comprising:
an electrically controllable source of radiant energy;
first and second radiation-sensitive resistors positioned in the radiant energy produced by said source so as to be affected similarly by changes in the radiation level thereof;
first circuit means operable with said first resistor for setting the magnitude of said radiant energy to a level corresponding to the amplitude of said a-c supply voltage; and
second circuit means operable with said second resistor for controlling the magnitude, of said flow signal in response to changes in said radiant energy, so as to minimize changes in flow signal due to a-c supply voltage changes.

2. Apparatus as in claim 1, wherein said radiation-sensitive resistors are photo-resistors and said source of radiant energy is a light providing controllable illumination intensity.

3. Apparatus as in claim 2, wherein said photo-resistors are identical matched elements laid on a common substrate.

4. Apparatus as in claim 1, wherein said first circuit means comprises an operational amplifier the output of which is connected to said source of radiant energy; and
means for supplying to said amplifier a signal responsive to the line voltage.

5. Apparatus as in claim 4, including means for developing a reference voltage;
means for coupling said line voltage and said reference voltage to said amplifier to compare the two voltages to produce an error signal at the amplifier input; and
said first circuit means comprising feedback means including said first resistor for developing a negative feedback signal at the input of said amplifier to tend to maintain said error signal close to zero in the face of changes in line voltage.

6. Apparatus as in claim 5, wherein said feedback means comprises a multiplier to which a signal proportional to line voltage is applied and arranged to produce an output signal for comparison with said reference voltage.

7. Apparatus as in claim 6, wherein said second circuit means comprises a second multiplier including said second resistor; and
means to apply the flow signal to the input of said second multiplier so as to produce at the output thereof a net flow signal compensated for line voltage variations.

8. Apparatus as in claim 7, wherein said first and second multipliers are effectively identical so that the multiplication factors thereof track closely with changes in line voltage.

9. Apparatus as in claim 8, wherein said multipliers comprise voltage dividers each including a fixed resistor connected in series with the respective radiation-sensitive resistor.

10. In magnetic flowmeter apparatus of the type comprising means responsive to an a-c power supply source for producing a corresponding a-c magnetic field in the flowing liquid, means for developing a flow signal corresponding to the a-c voltage generated by movement of the liquid through said field, and output means under the control of said flow signal;

that improvement in said apparatus for minimizing changes in said flow signal due to variations in the amplitude of the a-c supply voltage, comprising:
first and second electrical multipliers each adapted to receive an input signal and to produce a corresponding output signal which is proportional to the received signal in accordance with an adjustable multiplication thereof;

first circuit means coupling to said first multiplier a signal corresponding to said a-c supply voltage;

a reference voltage source;

comparison circuit means for comparing said reference voltage to the output of said first multiplier and operable to adjust the multiplication factor thereof so as to maintain said multiplier output substantially in accordance with said reference voltage;

means forming part of said two multipliers to cause the multiplication factor of said second multiplier to be equal to that of said first multiplier; and means for coupling said flow signal to the input of said second multiplier, so that the output thereof will represent the flow signal corrected for changes in line voltage.

11. Apparatus as in claim 10, wherein said comparison circuit means comprises an operational amplifier the output current of which controls the multiplication factors of both of said multipliers simultaneously and equally.

12. Apparatus as in claim 11, wherein said multipliers comprise attenuation networks each including a photo-resistor responsive to a common light source, said amplifier being arranged to control the illumination of said light source.

13. Apparatus as in claim 12, wherein said photoresistors are laid on a common substrate.

14. Apparatus as in claim 10, including rectifier means for developing a pulsed d-c signal with the pulses having an amplitude responsive to said line voltage; and means for coupling said pulses to said first multiplier together with said reference voltage.

15. Apparatus as in claim 14, wherein said pulses are sawtooth-shaped waves;

said reference source providing a d-c signal for comparison with said sawtooth-shaped waves; and said comparison means comprising an amplifier producing a square-wave output having a duty-cycle responsive to the amplitude of said sawtooth wave pulses.

16. Apparatus as in claim 15, wherein said reference source is a Zener diode.

17. Apparatus as in claim 15, wherein said rectifier means comprises peak-selecting capacitor storage means energized by the rectified a-c line voltage signal.

18. Apparatus as in claim 17, wherein the peak-selecting means includes means to discharge the storage capacitor before a charging cycle, so as to assure fast response.

19. For use with a magnetic flowmeter of the type wherein an a-c magnetic field is produced within a flowing liquid so as to develop on a pair of electrodes an a-c flow potential, and wherein the flow potential is extremely small so that it must be amplified and functionally transformed to produce a useful signal of suitable power indicative of rate of fluid flow;

electronic flow transmitter apparatus responsive to said a-c flow potential for producing a d-c output signal proportional to flow rate and comprising:

a set of individual modules each including a solid-state amplifier and including circuit elements providing a predetermined transfer function;

connecting means coupling said amplifier modules in a series cascade, open-loop (non-feedback) system configuration;

each of said modules receiving an input flow signal and producing a corresponding output flow signal;

the first module of said set comprising a balanced a-c amplifier with high input impedance to serve as a preamplifier;

the last module of said set providing a high power signal corresponding to the rate of flow of the liquid;

one of said set of modules including a phase-sensed rectifier to produce a d-c signal which is non-responsive to certain components of an a-c flow signal derived from the flow potential developed by the flowing liquid, said certain components being the components which have a quadrature phase relationship with respect to the phase of the flow potential;

input means coupling said flow potential to the input of said first module in said cascaded set of modules; and output means coupled to the last module in said set to provide said d-c output signal proportional to flow rate.

20. Apparatus as in claim 19, wherein one of said modules is an Invert and Sum module responsive to the flow signal developed by said pre-amplifier module.

21. Apparatus as in claim 20, wherein said Invert and Sum module comprises a first amplifier section for inverting one side of the flow signal; and a second amplifier section for summing the inverted signal with a non-inverted signal of the other side of the flow signal, thereby to cancel any common mode components appearing in said flow signal.

22. Apparatus as in claim 21, including means to adjust the amplitude of one of said signals applied to said summing amplifier to provide for zeroizing the common mode component in the output of said summing amplifier.

23. Apparatus as in claim 19, wherein another one of said cascaded modules is supplied with an a-c flow signal developed from said flow potential and includes means to derive 0° and 180° signal components of said a-c flow signal;

phase-splitting means responsive to said 0° and 180° components to produce a net output signal having a phase intermediate said 0° and 180° components; and means to adjust the phase angle of said intermediate phase signal;

said intermediate phase signal being directed as the input to the next circuit element in the cascaded sequence of said set of modules to produce said signal from said last module.

24. Apparatus as in claim 23, wherein said adjustment means comprises a network having a capacitor to be connected to any one of a series of different resistors; and switch means for selecting the resistance value to be connected to said capacitor.

25. Apparatus as in claim 19, wherein another one of said modules includes means to inject into the flow signal of that other one module a-c components which are in-phase with the flow signal and of quadrature phase with respect thereto; and means to adjust the relative amplitudes of said in-phase and quadrature components.

26. Apparatus as in claim 19, wherein another one of said modules includes phase-shifting means to shift the flow signal of that other one module approximately 90° and into phase alignment with the a-c supply voltage for the flow head magnetizing coils.

27. Apparatus as in claim 26, wherein said phase-shifting means also provides increasing gain with increasing frequency to compensate for changes in flow potential with changes in operating frequency of said a-c magnetic field.

28. Apparatus as in claim 19, wherein another one of said set of modules includes means for injecting into the associated amplifier, for combining with the flow signal passing therethrough, a signal for producing a live zero component in the d-c output signal.

29. Apparatus as in claim 19, wherein said system additionally includes a line-voltage compensation module having compensation means responsive to changes in the amplitude of the a-c line-voltage used to develop said a-c magnetic field, said compensation means being operable thereby to change correspondingly the amplifier gain in one part of the cascaded set of modules.

30. Apparatus as in claim 19, wherein another one of said set of modules includes means for adjusting the overall system gain applicable to the flow signal passing through said modules, to provide a calibrated output for a particular application.

* * * * *